Feb. 2, 1954   D. F. SAURENMAN ET AL   2,667,930
CASING SCRAPER
Filed April 6, 1948   2 Sheets-Sheet 1

DEAN F. SAURENMAN,
PAUL E. HILTON,
INVENTORS.

BY
Mellin and Hanscom
ATTORNEY.

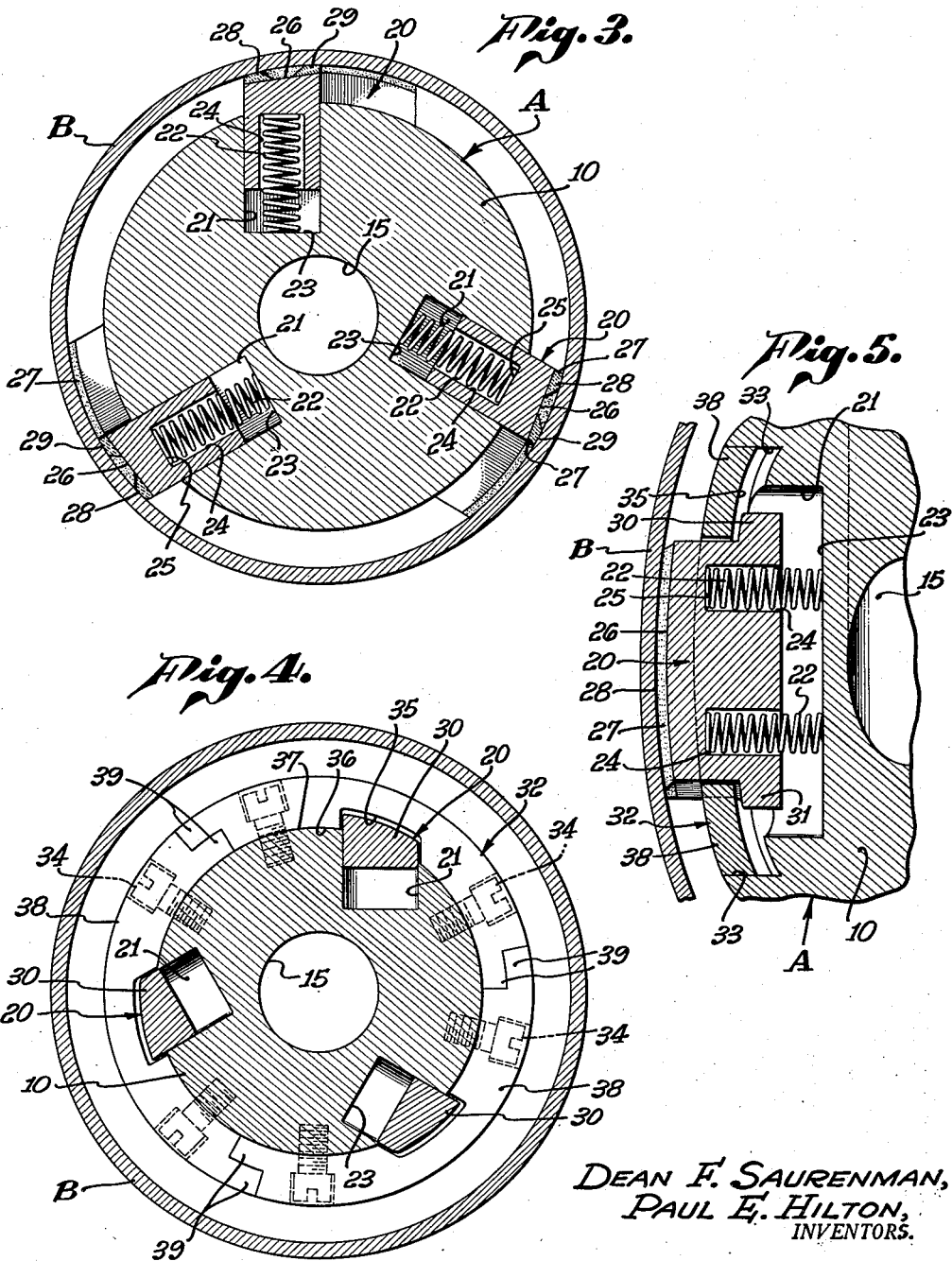

Patented Feb. 2, 1954

2,667,930

UNITED STATES PATENT OFFICE 2,667,930

CASING SCRAPER

Dean F. Saurenman and Paul E. Hilton, Houston, Tex., assignors to Baker Oil Tools, Inc., Vernon, Calif., a corporation of California Application April 6, 1948, Serial No. 19,396

7 Claims. (Cl. 166—18)

The present invention pertains to devices for cleaning the inner walls of well casings, liners and similar conduits, and more particularly to casing scrapers capable of scraping a film or cake of cement, mud, paraffin, gun shot burrs, or any type of scaly material, from the wall of such conduit.

Devices are known for removing the above substances from the inner walls of well conduits. The material on the interior of the casing may be difficult to dislodge or it may be relatively easy to remove. As an example, a cake of drilling mud can usually be dislodged without difficulty, whereas gun shot burrs may require repeated drilling or scraping action before their slight projection into the casing is removed.

Accordingly, it is an object of the present invention to provide an improved casing scraper, which is capable of removing substances from the wall of the well conduit through either longitudinal motion or rotary motion. Thus, certain easily removable casing coatings, such as drilling mud, can be cleaned from the casing wall during the running of the scraper on the drilling string down through the conduit, the entire circumference of the casing being cleaned. However, upon substantial resistance being encountered to lowering of the scraping tool, or if the scraping tool is arrested entirely, it can be rotated to remove the resistance cause. As a result, it is unnecessary to rotate the tool during its entire descent through the well conduit, which is a time consuming and relatively costly operation.

A further object of the invention is to provide a casing scraper whose cutter blades are so mounted as to be effective as a scraping instrumentality during longitudinal movement of the scraper through the well casing, as well as during its rotation in the well casing.

Yet another object of the invention is to provide a casing scraper having a plurality of scraping blades providing complete circumferential contact with the inner surface of the casing.

Another object of the invention is to provide a casing scraper whose cutting blades perform a shearing action on the material being removed from the casing during both longitudinal movement and rotation of the casing scraper within the casing.

Yet a further object of the invention is to provide a casing scraper whose blades are capable of performing their cutting and cleaning operation during upward and downward movement in the casing, and also upon rotation within the casing.

Still another object of the invention is to provide a casing scraper which operates smoothly and without any tendency to wobble or chatter.

Another object of the invention is to provide a casing scraper having a plurality of cutting or scraping blades disposed at an angle and arranged in such manner as to eliminate any tendency of the scraper to rotate as it is being run in or out of the casing, thereby preventing inadvertent disconnection of the casing scraper from the tubular string on which it is run in the well casing.

This invention possesses many other advantages, and has other objects which may be made more clearly apparent from a consideration of one of its embodiments. For this purpose, a form is shown in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings.

Figure 2:
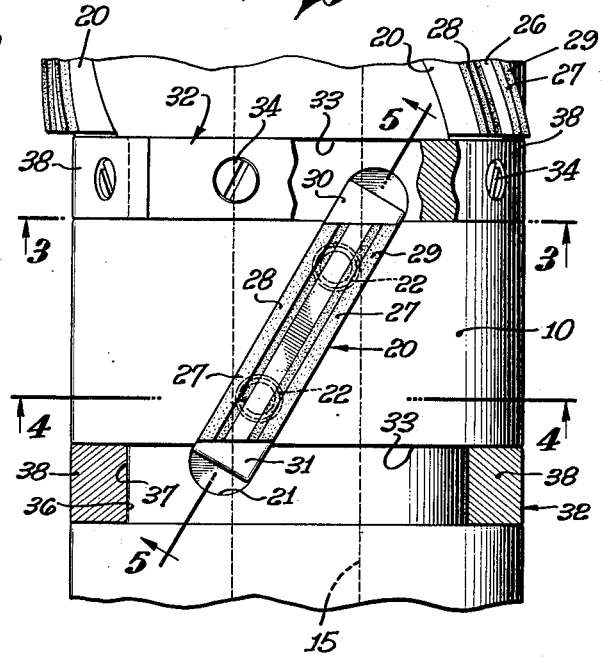
Fig. 2 is an enlarged fragmentary side elevation of part of the casing scraper, with certain parts shown in section.

Figs. 3, 4 and 5 are sections taken along the lines 3—3, 4—4 and 5—5, respectively, on Fig. 2.

The device A disclosed in the drawing is a casing scraper adapted to be run in a well casing, liner or similar well conduit B on the lower end of a tubular string of drill pipe C or the like, running to the top of the well bore. The main body 10 of the casing scraper is generally tubular in form, and has an upper pin 11 threaded into the adjacent drill pipe section C. It may also be provided with a lower threaded box 12 adapted to be secured to the pin end 13 of a lower drill bit 14. The casing scraper can be used in the absence of a lower drill bit, if desired.

A central passage 15 extends through the body 10, to permit drilling fluid, or other circulating fluid, to be pumped down through the string of drill pipe C and through the body 10 for discharge from the lower end of the latter. The circulating fluid then proceeds upwardly around the body 10 and drill pipe string C to the top of the well bore. As is well known, such circulating fluid carries the cuttings or scrapings to the top of the well bore and maintains the cutting portions of the tool in comparatively clean condition.

The body has a plurality of sets 16, 17, 18, 19 of scraper blades 20 mounted yieldably on it. Four sets are disclosed in the drawings, but this number can be varied if desired. Each blade 20 in each set is slidably mounted for transverse movement within a groove 21 formed in the body and inclined with respect to the axis of the body, or to the vertical. Each blade is urged outwardly of the groove by one or more helical compression springs 22 bearing against the base 23 of the groove and extending into pockets 24 in the inner portion of the blade 20, for bearing action against the bases 25 of the pockets.

The helical springs 22 urge each blade 20 outwardly and yieldably into contact with the inner wall of the well casing B, or other conduit to be cleaned. Because of the angularity of the cutter or scraper blades 20, and in order to obtain their full bearing against the casing wall, their outer surfaces 26 are formed to lie upon the surface of an ellipse. The outer surfaces are preferably hard-faced with suitable material 27, such as tungsten carbide, to provide a plurality of cutting edges or surfaces 28, 29 on opposite sides of each blade. These surfaces or edges are both effective to clean the inner wall of the well casing. Actually, in view of the surface contact between the cutter edges 28, 29 and the casing wall, the outer surfaces of the edges preferably coincide with an ellipsoidal or barrel shaped surface.

In order to center the casing scraper in the well casing, a plurality of scraper blades 20 is included in each set 16, 17, 18, 19. As disclosed in the drawings, the provision of three blades 20 in each set, spaced 120 degrees apart, serves as an effective means of centering the scraper body 10, and the tool itself, in the well casing. The number of blades, of course, can be varied without departing from the present invention.

Outward movement of the inclined blades 20 in each set under the influence of the springs 22 is limited by engagement of the stepped, upper and lower terminal portions 30, 31 of each blade with suitable stop devices. In the present instance, these devices are shown as consisting of segmental rings 32 fitting within peripheral grooves 33 at the upper and lower ends of each set of blades. The rings overlie the terminal portions 30, 31, and are secured to the body 10 by screws 34 or the like. Each ring has inner recesses 35 within which the terminal portions 30, 31 of a blade 20 is received, in order to permit the inner surface 36 of the ring to bear snugly against the base 37 of the peripheral groove 33, and insure firm attachment of the ring to the body 10. Each ring 32 is composed of a plurality of segments 38, whose ends 39 are mutually overlapped to afford a snug fit between the parts.

Figure 1:
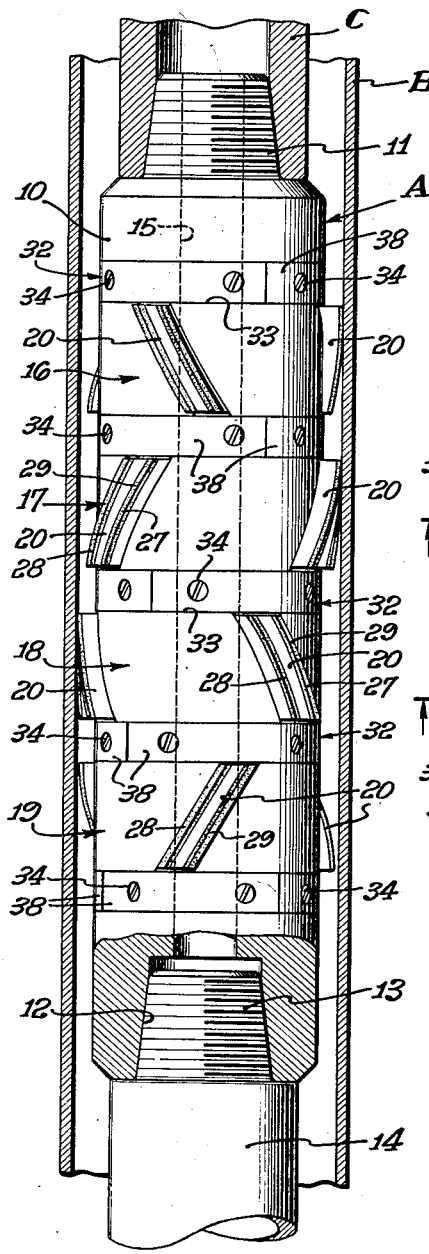
Figure 1 is a side elevation of a casing scraper disposed within a casing section, parts being shown in section.

In view of the provision of a plurality of sets 16, 17, 18, 19 of scraper blades on the body 10, the intermediate segmental stop or retainer rings 32 may serve to hold the adjacent ends of two sets of blades disposed within the body, as will be evident from Fig. 1. Of course, the inclined grooves 21 extend into the peripheral grooves 33, in order to permit free sliding movement of the blade terminal portions 30, 31 to and from the stop rings 32.

When the casing scraper A is fully assembled with the blades 20 unconfined by the casing B, the springs 22 urge the cutter blades outwardly to the fullest extent, as determined by engagement of the terminal portions 30, 31 with the segmental rings 32. The cutters 20 are then retracted against the force of the springs 22 and are placed within the casing B to be cleaned. The walls of the casing hold the blades inwardly against the spring force and space their terminal portions 30, 31 inwardly of the stop rings 32. As a result, the blades 20 may yield in conforming to the casing wall, insuring snug engagement with the latter at all times.

The sets of blades 16, 17, 18, 19 are arranged to overlap each other circumferentially of the body 10. Collectively, the sets of blades extend around the full circumference of the body and well casing. Thus, as specifically shown in the drawings, each set consists of three cutters 20, spaced substantially 120 degrees apart. Due to their inclination, the blades of each set will contact the casing wall along a substantial portion of its circumference. Since four sets of blades are disclosed, the blades of each set will engage the casing along a total of at least 90 degrees of arc. This figure is preferably somewhat greater than 90 degrees to obtain some circular overlapping between the blades of each set. Adjacent sets of blades are also disposed out of phase with respect to each other substantially 90 degrees. Since four sets are illustrated in the drawings, the disposition of the sets out of phase by 90 degrees in the same direction will insure that the blades collectively contact the full circumference of the well casing.

For reasons to be specified below, it is preferred that alternate sets of blades, or half the sets of blades, be inclined in opposite directions as will be clear from an inspection of Fig. 1, wherein sets 16 and 18 are inclined in the opposite direction with respect to sets 17 and 19.

It is to be understood that the extent of circumferential contact with the casing by the blades in each set; the angular displacement, or out of phase relationship, between the sets of blades; the angle of inclination of the blades; and the number of blades can be varied without departing from the invention.

In view of the circumferential overlapping of the sets of blades with respect to one another, downward movement of the tool A within the casing string B, through the aid of the drilling string C will cause the blades to shear any cake of material that may coat the casing wall. This shearing action will occur because of the angle at which the blades 20 are disposed. It will occur without rotation of the tool A. As an example, a cake of drilling mud is ordinarily readily removable from the casing wall, and such cake will be entirely removed through the mere longitudinal movement of the tool A through the well casing B.

In the event that descent of the tool A within the casing B is arrested by an obstruction which the blades 20 are unable to shear through mere longitudinal movement of the tool, the drilling string C and casing scraper A may be rotated to bring the blades 20 repeatedly into shearing contact with the obstruction, until the obstruction is completely removed. Such obstruction might consist of a sheath of hardened cement on the casing wall; or of gun shot burrs formed on the inside of the casing as a result of the shooting of bullets through the casing during a gun perforating operation; or the obstruction may consist of one or more bullets which may not have passed through the casing, but, instead, project inwardly into it. During rotation of the tool, the angle at which the blades 20 are set causes them to perform a shearing action on the material extending inwardly of the casing wall.

As indicated above, the blades 20 provide complete circumferential contact with the inner surface of the casing string B. Since they are all spring actuated, they follow the surface of the casing snugly regardless of variation in the casing wall. The contacting of the blades 20 with the casing B at many points insures smooth operation of the tool, as well as the elimination of any tendency for the tool to wobble or chatter. In addition, the arrangement of the sets of blades so that they are alternately angled in opposite directions eliminates all tendency for the scraper to rotate as it is being run in or out of the casing. The angling of all blades in the same direction might produce a tendency for the body to be unscrewed from the string of drill pipe during either raising or lowering of the tool within the well casing. The alternate angling of the blades in opposite directions neutralizes such tendency to rotate.

The double cutting edge 28, 29 on each blade, which, in effect, provides a cutting edge on both the upper and lower surfaces of each blade, enables the tool to perform a cutting or cleaning action during its upward longitudinal movement in the well casing, as well as during its lowering in the well casing. A double cleaning action is thus provided during the lowering of the well tool from the top of the well bore, and also during its removal from the lowermost level in the casing to the top of the well bore. Assurance is, therefore, had of a casing string with a relatively clean inner wall surface.

The inventors claim:

1. In a casing scraper: a main body adapted for attachment to a drilling string, said body having sets of longitudinally spaced grooves, the grooves of one set being inclined with respect to planes in which the body axis lies in the opposite direction from the grooves of the other set; cutter blades slidable laterally in the grooves of each set; and means in said body for urging said blades outwardly of said body; the disposition of said cutter blades in said oppositely inclined grooves minimizing the tendency of said main body to rotate with respect to the drilling string to prevent inadvertent disconnection of said main body from the drilling string.

2. In a casing scraper: a main body adapted for attachment to a drilling string, said body having sets of longitudinally spaced grooves, the grooves of one set being inclined with respect to planes in which the body axis lies in the opposite direction from the grooves of the other set; cutter blades slidable laterally in the grooves of each set and collectively disposed around the entire circumferential extent of said body; and means in said body for urging said blades outwardly of said body; the disposition of said cutter blades in said oppositely inclined grooves minimizing the tendency of said main body to rotate with respect to the drilling string to prevent inadvertent disconnection of said main body from the drilling string.

3. In a casing scraper: a main body adapted for attachment to a drilling string, said body having sets of longitudinally spaced grooves, the grooves of one set being inclined with respect to planes in which the body axis lies in the opposite direction from the grooves of the other set; cutter blades slidable laterally in the grooves of each set, said blades having outer scraper edges substantially conforming to a portion of an elliptical curve; spring means in said grooves engageable with said blades for urging said blades outwardly of said body; and stop means common to adjacent sets of blades for limiting the extent of outward movement of the blades in said adjacent sets.

4. In a casing scraper: a main body adapted for attachment to a drilling string, said body having sets of longitudinally spaced grooves; cutter blades slidable laterally in the grooves of each set, said blades having outer scraper edges substantially conforming to a portion of an elliptical curve; spring means in said grooves engageable with said blades for urging said blades outwardly of said body; and stop means common to adjacent sets of blades for limiting the extent of outward movement of the blades in said adjacent sets.

5. In a casing scraper: a main body adapted for attachment to a drilling string, said body having sets of longitudinally spaced grooves; cutter blades slidable laterally in the grooves of each set, said blades having outer scraper edges substantially conforming to a portion of an elliptical curve; the outer scraper edges of said blades collectively being disposed around the entire circumferential extent of said body; means in said grooves engageable with said blades for urging said blades outwardly of said body; and stop means common to adjacent sets of blades for limiting the extent of outward movement of said blades.

6. In a casing scraper: a main body adapted for attachment to a drilling string, said body having a circumferential groove and sets of longitudinally spaced grooves on opposite sides of said circumferential groove and extending thereinto, the grooves of one set being inclined with respect to planes in which the body axis lies in the opposite direction from the grooves of the other set, the grooves of one set being offset with respect to the grooves of the other set; cutter blades slidable laterally in the grooves of each set, said blades having outer scraper edges substantially conforming to a portion of an elliptical curve; means in said grooves engageable with said blades for urging said blades outwardly of said body; and stop means in said circumferential groove common to adjacent sets of blades for limiting the extent of outward movement of the blades in said adjacent sets.

7. In a casing scraper: a main body adapted for attachment to a drilling string, said body having a circumferential groove and sets of longitudinally spaced grooves on opposite sides of said circumferential groove and extending thereinto, the grooves of one set being offset with respect to the grooves of the other set; cutter blades slidable laterally in the grooves of each set, said blades having outer scraper edges substantially conforming to a portion of an elliptical curve; means in said grooves engageable with said blades for urging said blades outwardly of said body; and stop means in said circumferential groove common to adjacent sets of blades for limiting the extent of outward movement of the blades in said adjacent sets.

DEAN F. SAURENMAN.
PAUL E. HILTON.

References Cited in the file of this patent

UNITED STATES PATENTS

| Number | Name | Date |
| --- | --- | --- |
| 1,809,975 | Kattrein et al. | June 16, 1931 |
| 2,210,824 | Walker | Aug. 6, 1940 |
| 2,275,939 | Baker | Mar. 10, 1942 |
| 2,295,058 | Smethers | Sept. 8, 1942 |
| 2,326,528 | Festervan et al. | Aug. 10, 1943 |
| 2,424,027 | Gist | July 15, 1947 |
| 2,464,390 | Hammer | Mar. 15, 1949 |
| 2,472,749 | Lake | June 7, 1949 |